US010767588B2

(12) United States Patent
Itano et al.

(10) Patent No.: US 10,767,588 B2
(45) Date of Patent: Sep. 8, 2020

(54) CONTROL APPARATUS FOR ENGINE

(71) Applicant: MITSUBISHI JIDOSHA KOGYO KABUSHIKI KAISHA, Tokyo (JP)

(72) Inventors: Ryosuke Itano, Tokyo (JP); Toshiyuki Miyata, Tokyo (JP); Hitoshi Toda, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 16/120,688

(22) Filed: Sep. 4, 2018

(65) Prior Publication Data

US 2019/0093585 A1    Mar. 28, 2019

(30) Foreign Application Priority Data

Sep. 25, 2017    (JP) ................................ 2017-183475

(51) Int. Cl.
*F02D 41/18*    (2006.01)
*F02D 41/34*    (2006.01)
(Continued)

(52) U.S. Cl.
CPC .......... *F02D 41/182* (2013.01); *F02B 25/145* (2013.01); *F02D 13/0234* (2013.01);
(Continued)

(58) Field of Classification Search
CPC ... H01M 2/0237; H01M 2/043; F02B 25/145; F02D 13/0234; F02D 13/0238;
(Continued)

(56) References Cited

U.S. PATENT DOCUMENTS 7,607,416 B2 * 10/2009 Sato ..................... F02D 13/0234
                                                          123/406.24
10,107,179 B2 * 10/2018 Kawabe .............. F02D 41/3094
(Continued)

FOREIGN PATENT DOCUMENTS

EP    2037107 A2    3/2009
EP    2397675 A2    12/2011
(Continued)

OTHER PUBLICATIONS

Extended European Search Report, dated Feb. 21, 2019, for European Application No. 18193934.9.
(Continued)

*Primary Examiner* — Jesse S Bogue
(74) *Attorney, Agent, or Firm* — Birch, Stewart, Kolasch & Birch, LLP

(57) ABSTRACT

The control apparatus for an engine includes: a first controller that sets a valve-opening timing of an intake valve of the engine in response to an amount of intake air; and a second controller that sets an injection start time of a fuel injector of the engine in response to the amount of intake air. In a case where the amount of intake air is within a first range being equal to or more than a predetermined value, the first controller advances the valve-opening timing as compared with a case where the amount of intake air is equal to the predetermined value, and the second controller delays the injection start time as compared with a case where the amount of intake air is within a second range being less than the predetermined value.

13 Claims, 6 Drawing Sheets

(51) Int. Cl.
  *F02D 41/00* (2006.01)
  *F02D 13/02* (2006.01)
  *F02B 25/14* (2006.01)
(52) U.S. Cl.
  CPC ..... *F02D 13/0238* (2013.01); *F02D 13/0261* (2013.01); *F02D 41/0007* (2013.01); *F02D 41/345* (2013.01); *F02D 2041/001* (2013.01); *F02D 2200/04* (2013.01); *F02D 2200/0411* (2013.01)
(58) Field of Classification Search
  CPC .......... F02D 13/0261; F02D 2041/001; F02D 2200/04; F02D 2200/0411; F02D 41/0007; F02D 41/182; F02D 41/345
  See application file for complete search history.

(56) References Cited

U.S. PATENT DOCUMENTS

| | | | |
|---|---|---|---|
| 2009/0070011 A1 | 3/2009 | Takamiya et al. | |
| 2009/0070014 A1* | 3/2009 | Miyashita | F02D 13/0261 701/105 |
| 2009/0276142 A1* | 11/2009 | Leone | F02D 13/0215 701/103 |
| 2014/0331651 A1* | 11/2014 | Nishikiori | F02D 41/1475 60/285 |
| 2014/0364273 A1* | 12/2014 | Martin | B60W 10/06 477/3 |
| 2015/0096282 A1* | 4/2015 | Takagi | F02B 25/145 60/273 |
| 2016/0053693 A1* | 2/2016 | Hokuto | F02D 41/024 60/285 |
| 2016/0090927 A1* | 3/2016 | Kawabe | F02D 13/0261 123/294 |
| 2019/0292950 A1* | 9/2019 | Itano | F02D 13/0261 |

FOREIGN PATENT DOCUMENTS

| | | |
|---|---|---|
| FR | 2879258 A1 | 6/2006 |
| JP | 7-11962 A3 | 1/1995 |
| JP | 8-170550 A | 7/1996 |
| JP | 2001-221083 A | 8/2001 |
| JP | 4532004 B2 | 6/2010 |

OTHER PUBLICATIONS

European Office Action for European Application No. 18193934.9, dated Mar. 12, 2020.

\* cited by examiner

CONTROL APPARATUS FOR ENGINE

CROSS-REFERENCE TO THE RELATED APPLICATION

This application incorporates by references the subject matter of Japanese Patent Application No. 2017-183475 filed in Japan on Sep. 25, 2017 on which a priority claim is based under 35 U.S.C. § 119(a).

FIELD

This disclosure relates to a control apparatus for an engine including a port injector and a variable valve mechanism that changes opening/closing timings of an intake valve.

BACKGROUND

Some of traditional engines employ a valve overlap period in which respective open states of an intake valve and an exhaust valve overlap with each other for the sake of improving scavenging efficiency of combustion gas and/or charging efficiency of intake air. An engine equipped with a turbocharger, for example, can improve the charging efficiency by prolonging the valve overlap period, achieving a rise in engine output. In view of this, techniques have been developed to make opening/closing timings of the intake valve and/or the exhaust valve of the engine variable and to control the valve overlap period in response to an engine load and the like (e.g., Japanese Patent Laid-Open No. H7-11962).

However, in an engine equipped with a port injector, the longer the valve overlap period is set, the easier it becomes to cause so-called pass-through, which is a phenomenon that the mixture flowing from the intake passage into the cylinder passes directly through to the exhaust passage. When the pass-through occurs, the fuel supplied by port injection passes through the cylinder and flows out toward the exhaust passage, so that engine output and/or exhaust performance may be deteriorated. This pass-through is more likely to happen when the target torque of the engine is large (i.e., as the load increases) and tends to occur, for example, as supercharging pressure becomes higher than the exhaust pressure. In addition, during travels in high altitudes whose atmospheric pressure is lower than the normal atmospheric pressure, the density of air is decreased, so that, if the valve overlap period is set as with the case in the normal atmospheric pressure, the output may drop due to the charging efficiency not reaching the desired value.

The present disclosure is devised with the foregoing problems in view, and one of the objects thereof is to provide a control apparatus for an engine, that can suppress the pass-through while achieving a desired engine output. In addition to the above object, advantageous effects that are introduced from each configuration in the following embodiments to carry out the invention but traditional techniques have not achieved, can be also regarded as other objects of the present disclosure.

SUMMARY (1) An aspect of the present invention is a control apparatus for an engine, the engine including a fuel injector that injects fuel into an intake port, a variable valve mechanism that changes opening/closing timings of at least an intake valve, and a first detector that detects an amount of intake air flowing through an intake passage of the engine, the control apparatus including: a first controller that sets a valve-opening timing of the intake valve in response to the amount of intake air; and a second controller that sets an injection start time of the fuel injector in response to the amount of intake air. In a case where the amount of intake air is within a first range being equal to or more than a predetermined value, the first controller advances the valve-opening timing as compared with a case where the amount of intake air is equal to the predetermined value. Further, in the case where the amount of intake air is within the first range, the second controller delays the injection start time as compared with a case where the amount of intake air is within a second range being less than the predetermined value.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and thus are not limitative of the present invention and wherein.

DETAILED DESCRIPTION

The control apparatus for an engine, according to at least one embodiment will now be described with reference to the accompanying drawings. The following embodiment is merely illustrative and does not intend to exclude any other modification or application not illustrated in the following embodiment. Each element of the present embodiment may be modified in various manners without departing from the purpose of the embodiment. The elements of the present embodiment can be combined in any form as appropriate and some of the elements may be omitted.

1. Engine

Figure 1:
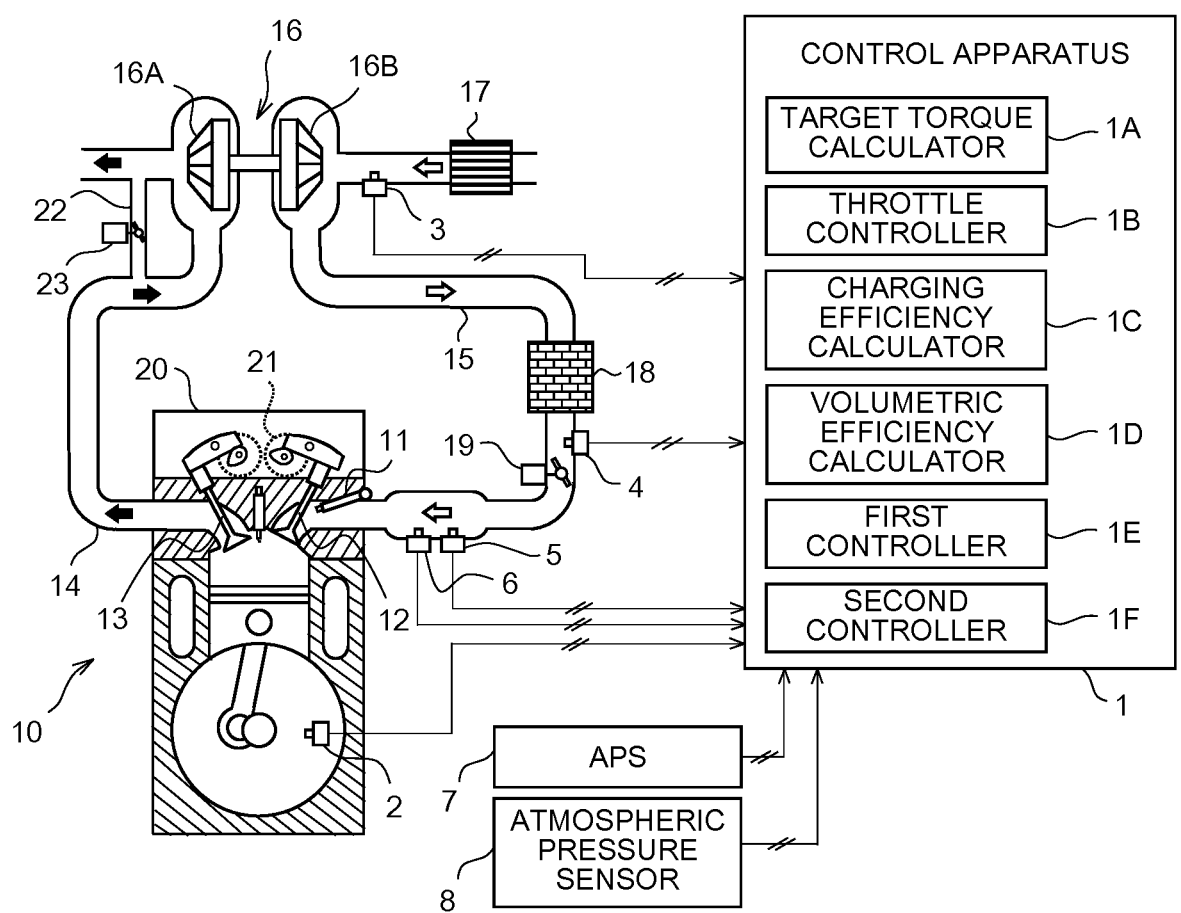
FIG. 1 is a block diagram of a control apparatus according to at least one embodiment and a diagram illustrating a configuration of an engine applied with the control apparatus.

The control apparatus 1 according to at least one embodiment is applied to an in-vehicle gasoline engine 10 (hereinafter, simply referred to as an engine 10). This engine 10 is a 4-stroke (4-cycle) engine including at least one of a fuel injection system that uses port injection and a turbocharging system that applies exhaust pressure. FIG. 1 illustrates one of cylinders provided in the multi-cylinder engine 10.

Each of the cylinders is provided with a port injector 11 (fuel injector) that injects fuel in an intake port. The fuel injected from the port injector 11 is atomized in the intake port and is introduced to the cylinder in a state well-mixed with intake air (fresh air). The amount of fuel to be injected from the port injector 11 and its injection period are controlled by the control apparatus 1. For example, a control pulse signal is transmitted from the control apparatus 1 to the port injector 11 and an injection port of the port injector 11 is opened for a period corresponding to the magnitude of the control pulse signal. Accordingly, the amount of fuel injection comes to conform to the magnitude (drive pulse width) of the control pulse signal and the injection start time comes to correspond to the time at which the control pulse signal is transmitted.

An intake valve 12 and an exhaust valve 13 are provided to the respective openings of the intake port and an exhaust port. Each upper end portion of the intake valve 12 and the exhaust valve 13 is connected to a rocker arm provided in a variable valve mechanism 20 and is independently driven up and down in reciprocating motion in response to the rocking motion of the rocker arm. The other end of each rocker arm is provided with a cam axially supported by a camshaft. The rocking patterns of the rocker arms are defined in accordance with shapes of the cams (cam profiles). Opening/closing timings of the intake valves 12 and the exhaust valves 13 are controlled by the control apparatus 1 via the variable valve mechanism 20.

The variable valve mechanism 20 according to at least one embodiment is provided with a valve timing adjusting mechanism 21 as a feature for changing the timing of the rocking motion of each rocker arm. The valve timing adjusting mechanism 21 is a mechanism that changes the opening/closing timings of the intake valves 12 and the exhaust valves 13, and has a function that changes rotational phases of the cams or the camshafts generating the rocking motions in the rocker arms.

The parameter corresponding to the opening/closing timings for control is called a phase angle. The phase angle is a quantity indicating how much the phase of each cam is advanced or delayed compared to the phase of a criterial camshaft and corresponds to each opening/closing timing (a valve-opening timing and a valve-closing timing) of the intake valve 12 and the exhaust valve 13. The phase angle is calculated and set by the control apparatus 1 and is transmitted to the valve timing adjusting mechanism 21. The valve timing adjusting mechanism 21 arbitrarily controls the opening/closing timings by adjusting the phase angles (an intake phase angle and an exhaust phase angle) of each cams.

The intake/exhaust system of the engine 10 is equipped with a turbocharger 16 that supercharges intake air to the cylinders by applying exhaust pressure. The turbine 16A of the turbocharger 16 is provided in an exhaust passage 14 and the compressor 16B of the same is provided in an intake passage 15. Supercharging operation by the turbocharger 16 is controlled by the control apparatus 1. An air filter 17 is disposed on an upstream side of the compressor 16B with respect to the flow of intake air and filters the air drawn in from the outside. In addition, an intercooler 18 is disposed on a downstream side of the compressor 16B with respect the flow of intake air and cools the compressed air. An electrically-controlled throttle valve 19 is disposed on the downstream side of the intercooler 18. The amount of air flowing to the intake ports is adjusted in response to the opening (throttle opening) of the throttle valve 19. The throttle opening is controlled by the control apparatus 1. It should be noted that a non-illustrated catalytic converter is disposed on the downstream side of the turbine 16A.

The exhaust passage 14 is provided with an exhaust bypassing passage 22 so as to connect the upstream and the downstream sides of the turbine 16A to each other. Further, an electrically-controlled wastegate valve 23 is provided in the exhaust bypassing passage 22. The wastegate valve 23 is a supercharging pressure adjusting valve that changes the supercharging pressure by controlling an amount of exhaust gas flowing in toward the turbine 16A. The wastegate valve 23 is provided with an actuator and the positon (i.e., the aperture) of the valve body is electrically controlled. The action of the actuator is controlled by the control apparatus 1.

The engine 10 is equipped with a rotational speed sensor 2 that detects rotational speed Ne of the engine 10, an air flow sensor 3 (first detector, first detecting means) that detects an amount of intake air flowing through the intake passage 15, a throttle upstream pressure sensor 4 that detects upstream pressure of the throttle valve 19, an intake manifold pressure sensor 5 that detects intake manifold pressure, and an intake air temperature sensor 6 that detects temperature of intake air. In addition, the vehicle is equipped with an accelerator position sensor 7 (APS) that detects a pressed amount (an accelerator opening) of an accelerator pedal. The accelerator opening is a parameter corresponding to the driver's demand on acceleration and/or intention to move forward, and in other words, is a parameter correlating with a load of the engine 10 (an output demand to the engine 10). Further, the vehicle is equipped with an atmospheric pressure sensor 8 (second detector, second detecting means) that detects an atmospheric pressure. The atmospheric pressure sensor 8 may be provided to the engine 10 or be incorporated into the control apparatus 1. Various pieces of information detected by the sensors 2 to 8 are transmitted to the control apparatus 1.

The control apparatus 1 is an electronic control unit (computer, ECU) that comprehensively controls broad systems such as an ignition system, a fuel system, the intake/exhaust system, and a valve actuating system, each relating to the engine 10. The control apparatus 1 includes LSI devices or built-in electronic devices, into which microprocessors, ROM, RAM, and the like are integrated, for example, and is connected to a communication line of an in-vehicle network provided in the vehicle. The control apparatus 1 controls the amount of air and the amount of fuel injection to be supplied to each cylinder of the engine 10, an ignition period for each cylinder, the supercharging pressure, and the like. The above-mentioned sensors 2 to 8 are connected to input ports of the control apparatus 1. The input information includes the engine rotational speed, the amount of intake air, the intake manifold pressure, the temperature of intake air, the accelerator opening, the atmospheric pressure, and the like.

The specific control targets of the control apparatus 1 are, for example, the amount of fuel injection to be injected from the port injector 11 and its injection period, the ignition period by a spark plug, the opening/closing timings of the intake valve 12 and the exhaust valve 13, the operation state of the turbocharger 16, the opening of the throttle valve 19, and the aperture of the wastegate valve 23. In the present embodiment, description will be made in relation to the control apparatus 1 that controls the valve-opening timing (the intake phase angle) of the intake valve 12 and the injection start time (SOI; Start of Injection, injection start angle) of fuel from the port injector 11. The control apparatus 1 according to at least one embodiment performs the control using two kinds of maps stored therein in advance.

2. Summary of Control

The control apparatus 1 sets each of the valve-opening timing (the intake phase angle) of the intake valve 12 and the injection start time (SOI) of fuel from the port injector 11 in response to the amount of intake air (i.e., the actual amount Q of intake air) detected by the air flow sensor 3. Then, the control apparatus 1 controls the valve-opening timing of the intake valve 12 by transmitting the valve-opening timing set as above to the valve timing adjusting mechanism 21. Further, the control apparatus 1 controls the injection period by transmitting the control pulse signal corresponding to the injection start time set as above to the port injector 11. It should be noted that the actual amount Q of intake air changes in response to the throttle valve 19 controlled based on a target amount of intake air calculated on the basis of a target torque T of the engine 10. The present embodiment assumes that the opening/closing timings of the exhaust valve 13 are invariable. Therefore, in the present embodiment, the valve overlap period is changed by changing the valve-opening timing of the intake valve 12.

In the above settings, the control apparatus 1 changes each setting manner of the valve-opening timing and the injection start time in at least one of a case where the actual amount Q of intake air is within a first range being equal to or more than a predetermined value Qo and a case where the actual amount Q of intake air is within a second range being less than the predetermined value Qo. Hereinafter, the first range is referred to as "the output focus area" and the second range is referred to as "the fuel consumption focus area". An area suitable for idle running may be set on a further low-load side with respect to the fuel consumption focus area, that is, within a third range where the actual amount Q of intake air is less than a second predetermined value which is less than the predetermined value Qo.

The output focus area is a medium-high-load area where the actual amount Q of intake air is relatively large and is an operational area focusing on the realization of an output (driver's demand torque) demanded on the engine 10. In the output focus area, supercharging is executed with the throttle opening full opened. In other words, the output focus area covers a range of the actual amount Q of intake air being in a condition where the supercharging by the turbocharger 16 is executed and the supercharging pressure is equal to or higher than the atmospheric pressure.

In contrast, the fuel consumption focus area is a low-load area where the actual amount Q of intake air is relatively small and is an operational area focusing on the improvement in fuel consumption. In the fuel consumption focus area, supercharging is not executed and the amount of intake air is controlled with the throttle opening. The valve-opening timing is set on the most delayed angle side in order to suppress the occurrence of knocking at the value (i.e., the predetermined value Qo) of the actual amount Q of intake air corresponding to the boundary of these areas. In other words, the value Qo of the actual amount Q of intake air where the valve-opening timing is set as the most delayed angle corresponds to the boundary of the output focus area and the fuel consumption focus area.

As such, in the case where the actual amount Q of intake air is within the output focus area, the control apparatus 1 advances the valve-opening timing as compared with the case where the actual amount Q of intake air is equal to the predetermined value Qo. The control apparatus 1 according to at least one embodiment advances the valve-opening timing (increases the quantity of advanced angle with respect to the predetermined value Qo) as the actual amount Q of intake air increases within the output focus area. Accordingly, as the load increases in the output focus area, the valve overlap period extends, leading to an increase in the amount of intake air to be introduced to the cylinders.

In the case where the actual amount Q of intake air is within the fuel consumption focus area, the control apparatus 1 according to at least one embodiment advances the valve-opening timing as compared with the case where the actual amount Q of intake air is equal to the predetermined value Qo. The control apparatus 1 according to at least one embodiment delays the valve-opening timing (decreases the quantity of advanced angle with respect to the predetermined value Qo) as the actual amount Q of intake air increases (approaches to the predetermined value Qo) within the fuel consumption focus area. Accordingly, in the fuel consumption focus area, an internal EGR amount increases, leading to a decrease in pumping loss.

Further, in the case where the actual amount Q of intake air is within the output focus area, the control apparatus 1 delays the injection start time as compared with the case where the actual amount Q of intake air is within the fuel consumption focus area. The control apparatus 1 according to at least one embodiment delays the injection start time (increases the quantity of delayed angle with respect to the predetermined value Qo) as the actual amount Q of intake air increases within the output focus area. In the output focus area, since the valve-opening timing is advanced and the valve overlap period is extended with an increase in the actual amount Q of intake air, delaying the injection start time in addition to the above suppresses the pass-through of the mixture.

The control apparatus 1 according to at least one embodiment sets the valve-opening timing and the injection start time by taking the atmospheric pressure into consideration. Specifically, the control apparatus 1 calculates charging efficiency Ec based on the actual amount Q of intake air and calculates volumetric efficiency Ev based on at least one of the charging efficiency Ec and the atmospheric pressure. Then, the control apparatus 1 calculates the valve-opening timings based on the charging efficiency Ec and the volumetric efficiency Ev, respectively, and calculates the injection start times based on the charging efficiency Ec and the volumetric efficiency Ev, respectively. The control apparatus 1 compares the two valve-opening timings calculated thereby, and when the two differ from each other, sets more advanced one as the valve-opening timing. Further, the control apparatus 1 compares the two injection start times calculated thereby, and when the two differ from each other, sets more delayed one as the injection start time. It should be noted that when the two equate to each other, the value itself is set as the valve-opening timing or the injection start time.

For example, in high altitudes whose atmospheric pressure is lower than the normal atmospheric pressure, since the density of air is decreased as compared with that in the normal atmospheric pressure (e.g., in plains), the valve-opening timing based on the charging efficiency Ec and the valve-opening timing based on the volumetric efficiency Ev do not equate, and the injection start time based on the charging efficiency Ec and the injection start time based on the volumetric efficiency Ev do not equate. In view of this, when the two valve-opening timings do not equate, by adopting more advanced one from the two and setting the adopted value as the final valve-opening timing, it is possible to perform the control considering the decrease in the density of air. Similarly, when the two injection start times do not equate, by adopting more delayed one from the two and setting the adopted value as the final injection start time, it is possible to perform the control considering the decrease in the density of air.

The control apparatus 1 according to at least one embodiment stores a control map for each engine rotational speed Ne in advance. Each of the control maps includes a pair of a first map in which the valve-opening timings are set for each of the charging efficiency Ec and the volumetric efficiency Ev, and a second map in which the injection start times are set for each of the charging efficiency Ec and the volumetric efficiency Ev. That is, each of the first maps illustrates the charging efficiency Ec or the volumetric efficiency Ev on a horizontal axis and the valve-opening timings on a vertical axis. Similarly, each of the second maps illustrates the charging efficiency Ec or the volumetric efficiency Ev on a horizontal axis and the injection start times on a vertical axis.

The control apparatus 1 according to at least one embodiment selects the control map that corresponds to the engine rotational speed Ne detected by the rotational speed sensor 2. Then, the control apparatus 1 obtains the valve-opening timings and the injection start times by applying the charging efficiency Ec and the volumetric efficiency Ev to the selected control map, selects suitable ones, and controls the valve timing adjusting mechanism 21, port injector 11, and the like.

Figure 2:
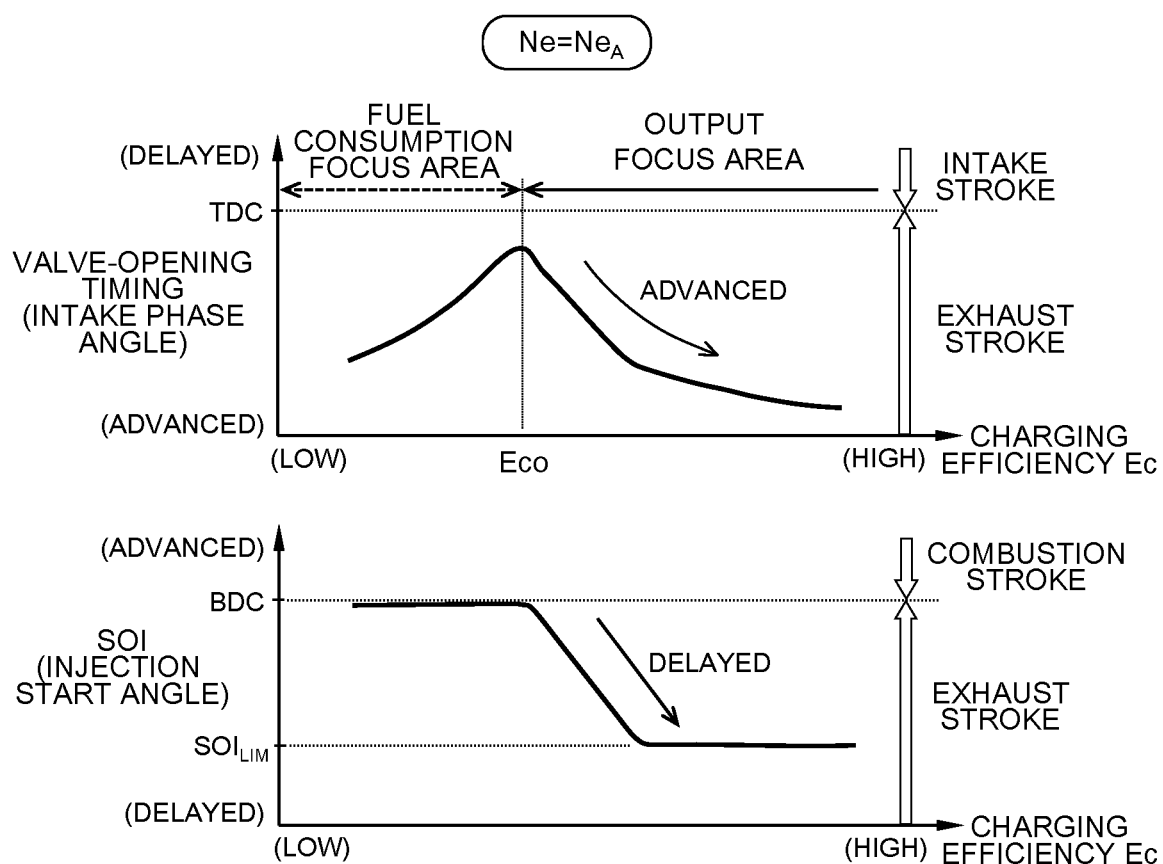
FIG. 2 is a map example depicting a first map and a second map each set in the control apparatus of FIG. 1 (a map example for normal pressure and engine rotational speed $Ne_A$)
Figure 3:
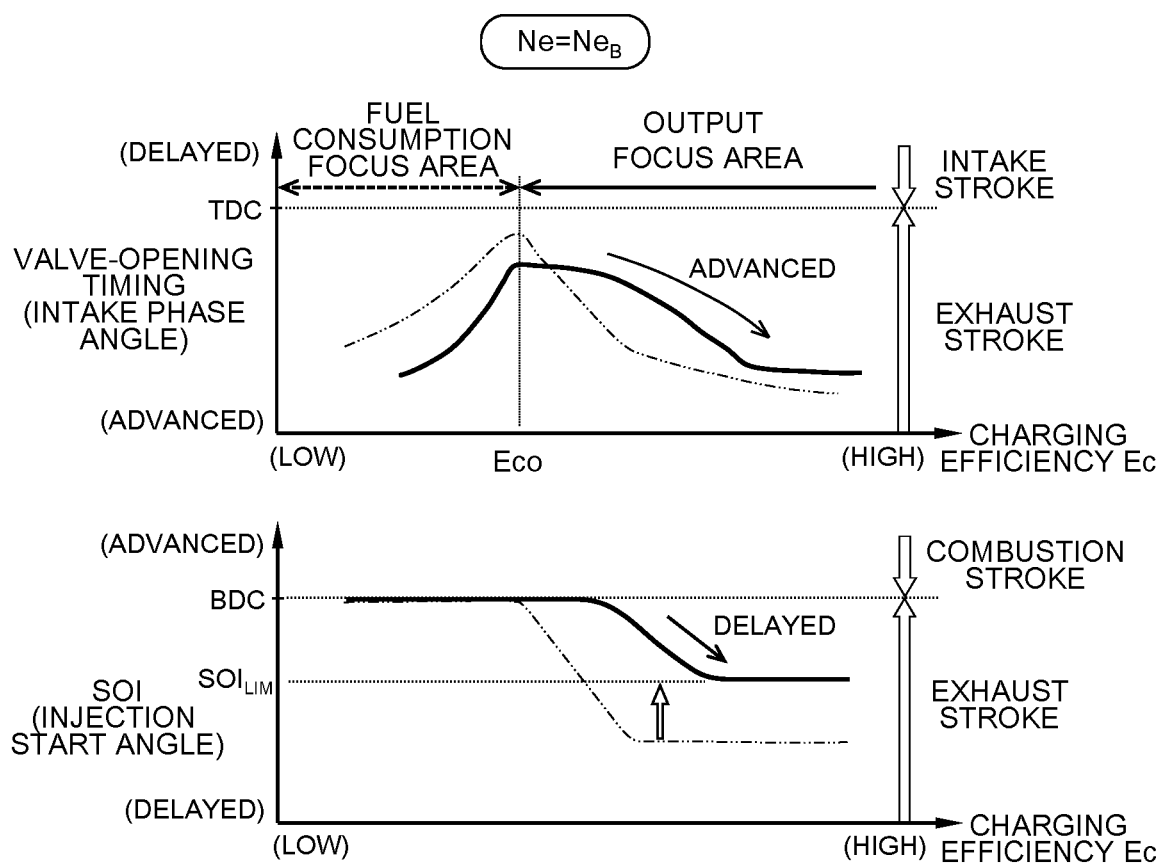
FIG. 3 is a map example depicting a first map and a second map each set in the control apparatus of FIG. 1 (a map example for normal pressure and engine rotational speed $Ne_B$)

FIGS. 2 and 3 each depict an example of a control map stored in the control apparatus 1, representing the charging efficiency Ec on the horizontal axis. The control maps representing the volumetric efficiency Ev on the horizontal axis are not depicted, but have the trend similar to those of the control maps of FIGS. 2 and 3. FIG. 2 depicts a control map for normal atmospheric pressure and the engine rotational speed Ne being first rotational speed $Ne_A$ (the map to be used in an operating condition of normal pressure and Ne=$Ne_A$). FIG. 3 depicts a control map for normal atmospheric pressure and the engine rotational speed Ne being second rotational speed $Ne_B$ which is higher than the first rotational speed $Ne_A$ (the map to be used in an operating condition of normal pressure and Ne=$Ne_B$). It should be noted that FIG. 3 depicts the graphs illustrated in FIG. 2 with two-dotted lines in an overlapped manner.

As illustrated in FIGS. 2 and 3, in the first maps of the control maps, two areas consisting of the output focus area (the first range) and the fuel consumption focus area (the second range) are set based on the charging efficiency Ec. The load value (the value Eco of the charging efficiency Ec) at the boundary of these areas corresponds to the above-mentioned predetermined value Qo of the actual amount Q of intake air. The valve-opening timing of the intake valve 12 is set on the most delayed angle side at the boundary value Eco corresponding to the predetermined value Qo.

In the output focus area, the valve-opening timing is set on the advanced angle side with respect to the value at the boundary value Eco and the injection start time is set on the delayed angle side with respect to the value in the fuel consumption focus area. Contrary to the above, in the fuel consumption focus area, the valve-opening timing is set on the advanced angle side with respect to the value at the boundary value Eco and the injection start time is set on the most advanced angle side (near the starting time of the exhaust stroke). Here, the valve-opening timing in the fuel consumption focus area is set so as to be delayed with an increase in the charging efficiency Ec. The valve-opening timing in the fuel consumption focus area suffices as long as being set to achieve the optimum fuel consumption and may not be limited to those depicted in FIGS. 2 and 3.

In each of the second maps according to at least one embodiment, a limit value $SOI_{LIM}$ of the injection start time on the delayed angle side is set and the injection start time is not to be delayed over the limit value $SOI_{LIM}$. The limit value $SOI_{LIM}$ is aimed at securing minimum mixing time for fuel and fresh air even when the injection start time is controlled to the most delayed angle. The limit value $SOI_{LIM}$, as indicated with the hollow arrow in the second map depicted in FIG. 3, is set on the further advanced angle side as the engine rotational speed Ne increases (i.e., more advanced in the case of $Ne_A$ than in the case of $Ne_B$). This is for securing the mixing time by suppressing the quantity of the delayed angle relating to the injection start time because the pass-through of the mixture occurs less as the engine rotational speed Ne increases. The reason that the pass-through occurs less is that, as the engine rotational speed Ne increases, the valve overlap period shortens because it takes less time per single rotation of a crankshaft of the engine 10, whereas the time that takes for the port injected fuel to reach the intake valve 12 is substantially constant irrespective of the engine rotational speed Ne.

Figure 4:
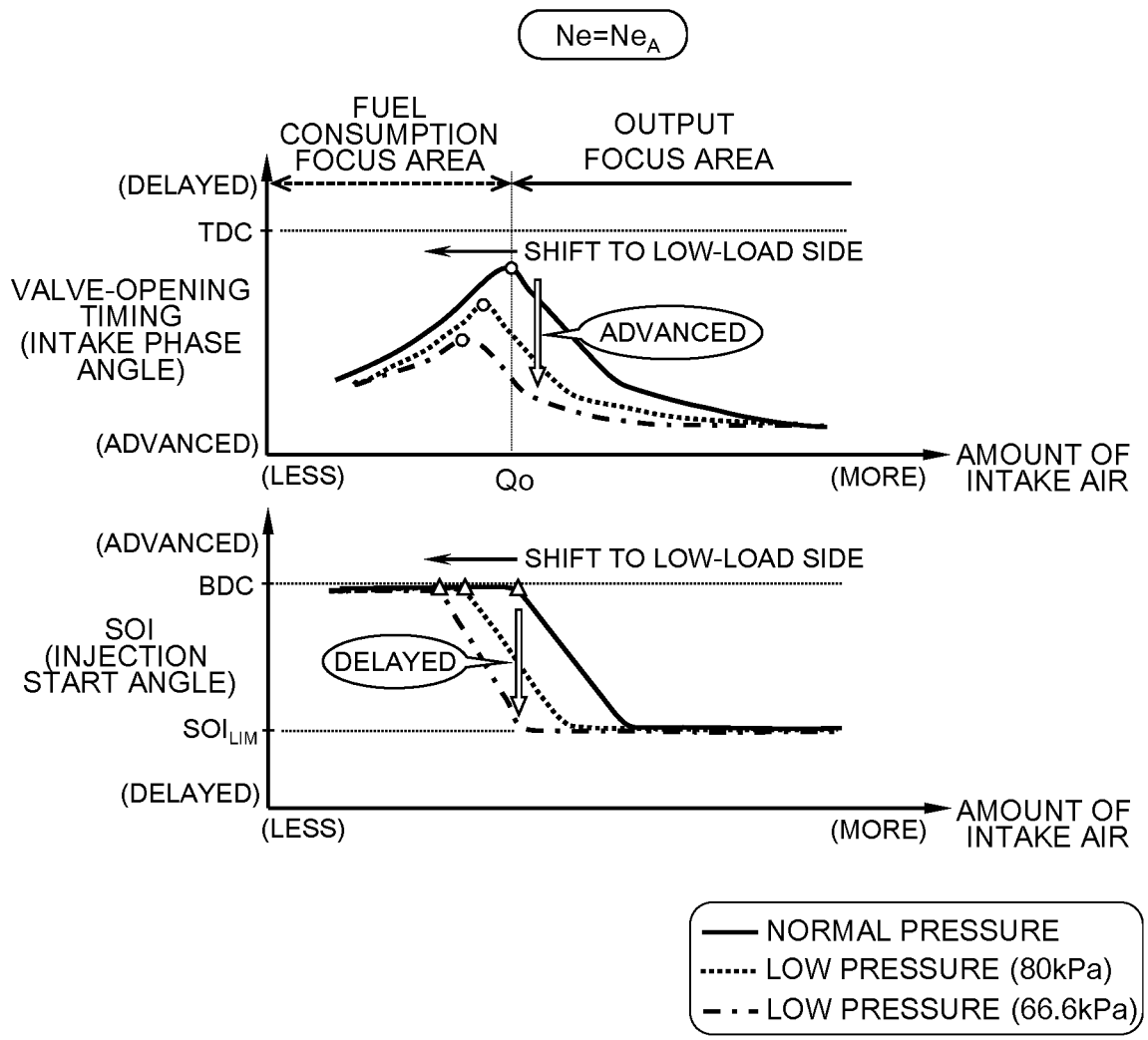
FIG. 4 is another map example set in the control apparatus of FIG. 1.
Figure 5:
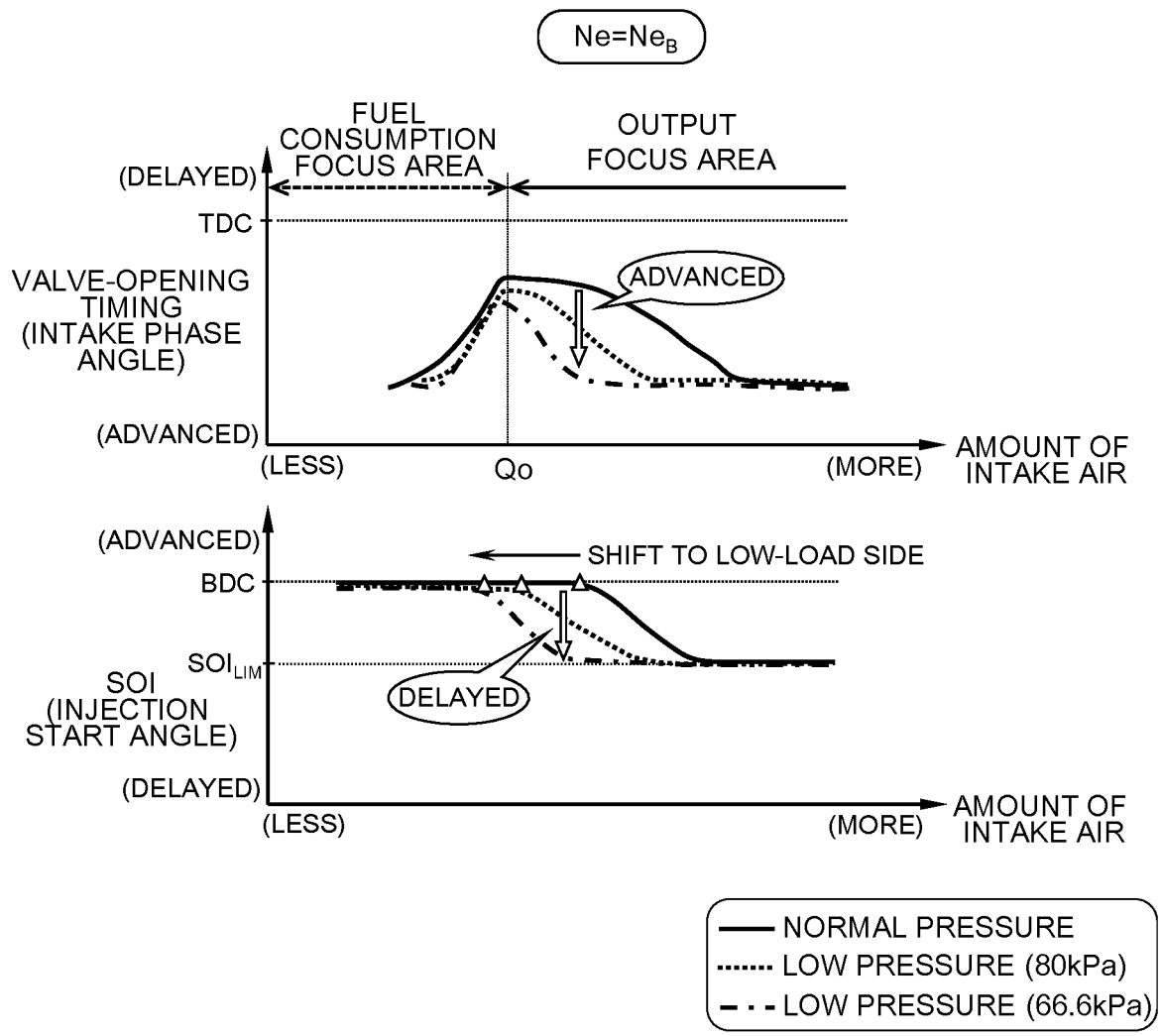
FIG. 5 is another map example for rotational speed different from that of FIG. 4.

In contrast to the control maps depicted in FIGS. 2 and 3, each of which represents the charging efficiency Ec on the horizontal axis, FIGS. 4 and 5 each depict an example of a control map representing the actual amount Q of intake air on the horizontal axis. FIG. 4 depicts a map for the engine rotational speed Ne being the first rotational speed $Ne_A$ and FIG. 5 is a map for the engine rotational speed Ne being the second rotational speed $Ne_B$. As depicted in FIGS. 4 and 5, when the actual amount Q of intake air is represented on the horizontal axis, the graphs of the valve-opening timing and the injection start time change under the influence of atmospheric pressure.

Specifically, as the atmospheric pressure lowers (as the density of air decreases), the valve-opening timing advances and the injection start time delays with respect to the same actual amount Q of intake air. Further, as illustrated by hollow circles in FIG. 4, the output focus area in the low rotation region stretches to the low-load side (the predetermined value Qo shifts to the low-load side) with a decrease in the atmospheric pressure. This is because, in low rotation states at high altitudes where the atmospheric pressure is low, the desired output might not be ensured unless the throttle valve 19 is fully opened (preferably, supercharging is executed) from the condition where the actual amount Q of intake air is less as compared with the condition in the normal atmospheric pressure. The fuel consumption focus area shrinks as the output focus area broadens in the low rotation region.

As illustrated by hollow triangles in FIGS. 4 and 5, the value of the actual amount Q of intake air, at which the injection start time starts being delayed, decreases as the atmospheric pressure lowers. In other words, the injection start time starts being delayed from the side on which the actual amount Q of intake air is low. According to the above, even when the atmospheric pressure is not the normal atmospheric pressure, the pass-through of fuel is suppressed while the output torque corresponding to the target torque T is ensured.

3. Configuration of Control

The control apparatus 1 records and saves programs for setting the valve-opening timing and the injection start time as mentioned above, and for controlling the variable valve mechanism 20, port injector 11, and the like in memory, for example. Alternatively, the programs are recorded and saved in a computer-readable recording medium, and are read and run by the control apparatus 1 via a reader connected to an interface device.

The programs include a target torque calculator 1A, a throttle controller 1B, a charging efficiency calculator 1C, a volumetric efficiency calculator 1D, a first controller 1E, and a second controller 1F. These elements represent partial functions of the programs run by the control apparatus 1 and are assumed to be provided by software. However, part of each function or entire functions may be provided by hardware (electronic circuit), or may be provided by combination of software and hardware.

The target torque calculator 1A calculates a target value of torque (i.e., the target torque T) to be output by the engine 10. The throttle controller 1B calculates the target amount of intake air based on the target torque T and controls the throttle valve 19 based on the target amount of intake air. The actual amount Q of intake air detected by the air flow sensor 3 changes with the throttle opening.

The charging efficiency calculator 1C (first calculator) calculates the charging efficiency Ec based on the actual amount Q of intake air. The volumetric efficiency calculator 1D (second calculator) calculates the volumetric efficiency Ev based on at least one of the actual amount Q of intake air and the atmospheric pressure. These calculations are performed by known methods, using the values detected by the above-mentioned sensors 3 to 7, for example. In the present embodiment, the charging efficiency calculator 1C and the volumetric efficiency calculator 1D each select the control map corresponding to the engine rotational speed Ne detected by the rotational speed sensor 2.

The first controller 1E (first controller, first control means) sets the valve-opening timing in response to the actual amount Q of intake air and controls the variable valve mechanism 20. In the case where the actual amount Q of intake air is within the output focus area, the first controller 1E advances the valve-opening timing as compared with the case where the actual amount Q of intake air is equal to the predetermined value Qo, and increases the quantity of the advanced angle as the actual amount Q of intake air increases. Further, the first controller 1E delays the valve-opening timing as the actual amount Q of intake air increases within the fuel consumption focus area.

The second controller 1F (second controller, second control means) sets the injection start time in response to the actual amount Q of intake air and controls the port injector 11. In the case where the actual amount Q of intake air is within the output focus area, the second controller 1F delays the injection start time as compared with the case where the actual amount Q of intake air is within the fuel consumption focus area, and increases the quantity of the delayed angle as the actual amount Q of intake air increases.

The present embodiment assumes that the first controller 1E and the second controller 1F respectively set the valve-opening timing and the injection start time by using the control maps.

That is, the first controller 1E according to at least one embodiment applies the calculated charging efficiency Ec and the calculated volumetric efficiency Ev to the first map of the selected control map and obtains at least one of the valve-opening timing based on the charging efficiency Ec and the valve-opening timing based on the volumetric efficiency Ev. Then, the first controller 1E sets more advanced one between the two obtained valve-opening timings as the valve-opening timing, and transmits the valve-opening timing to the valve timing adjusting mechanism 21 to control the valve-opening timing. Since the present embodiment assumes that the phase angle of the exhaust valve 13 is invariable (constant), the first controller 1E changes (adjusts) the valve overlap period by controlling the valve-opening timing of the intake valve 12.

The second controller 1F according to at least one embodiment applies the calculated charging efficiency Ec and the calculated volumetric efficiency Ev to the second map of the selected control map and obtains at least one of the injection start time based on the charging efficiency Ec and the injection start time based on the volumetric efficiency Ev. Then, the second controller 1F sets more delayed one between the two obtained injection start times as the injection start time, and transmits the control pulse signal to the port injector 11 such that the port injection is performed at the injection start time. The amount of fuel injection is calculated based on, for example, the charging efficiency Ec.

4. Flowchart

Figure 6:
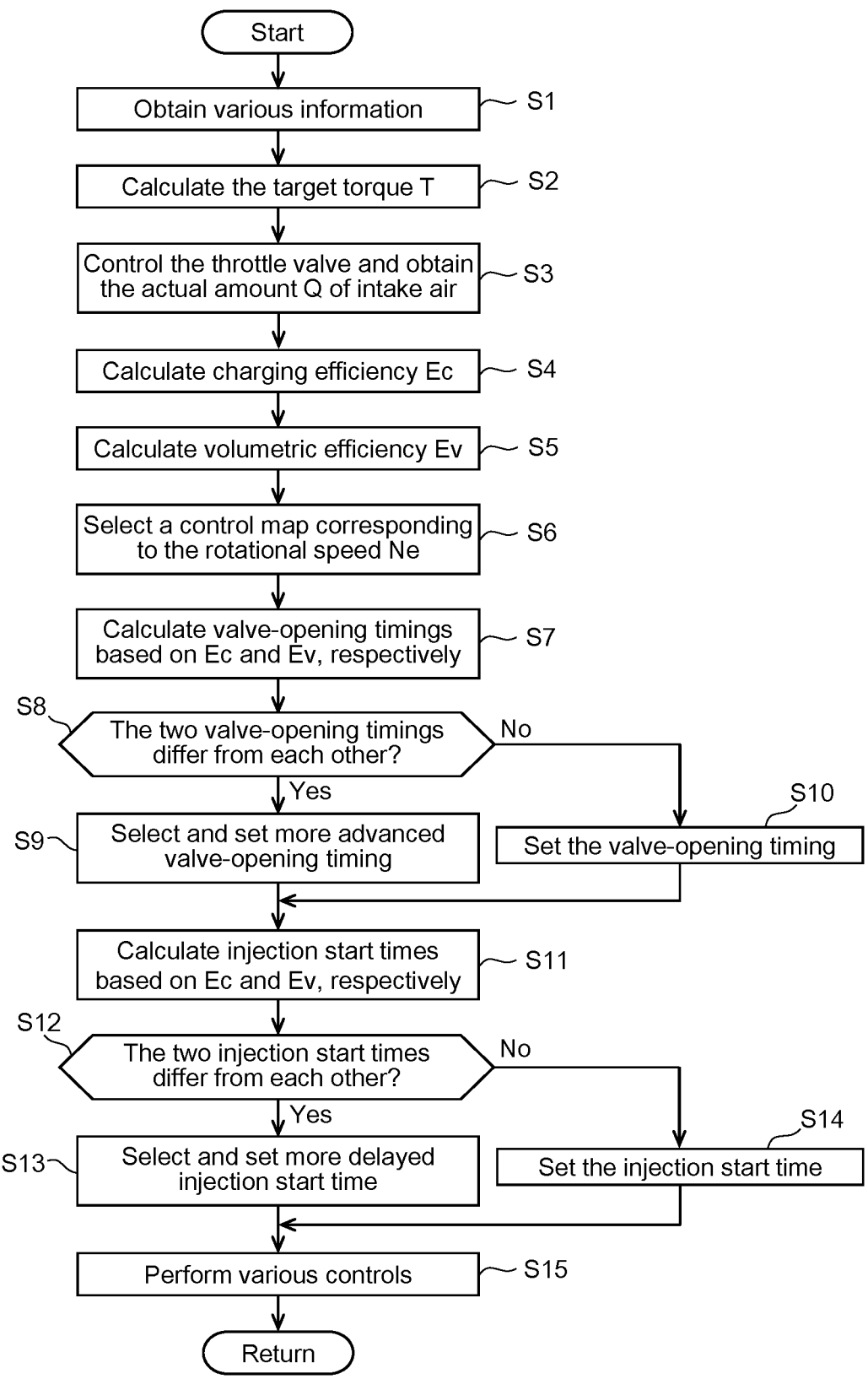
FIG. 6 is a flowchart illustrating a procedure of control to be performed by the control apparatus of FIG. 1.

FIG. 6 illustrates a flowchart example for explaining the contents of the above-mentioned control. This flowchart is followed by the control apparatus 1 at a predetermined calculation cycle when the main power of the vehicle is on.

First, various information detected by the above-mentioned sensors 2 to 8 is input to the control apparatus 1 (step S1) and the target torque T is calculated by the target torque calculator 1A (step S2).

At step S3, the throttle valve 19 is controlled by the throttle controller 1B and since this changes the amount of intake air, the actual amount Q of intake air is detected by the air flow sensor 3. Next, the charging efficiency Ec is calculated by the charging efficiency calculator 1C (step S4) and the volumetric efficiency Ev is calculated by the volumetric efficiency calculator 1D (step S5). Further, the control map corresponding to the engine rotational speed Ne is selected (step S6).

At step S7, the valve-opening timings are respectively obtained based on the charging efficiency Ec and the volumetric efficiency Ev, using the first maps. Then, the judgment is made on whether the two valve-opening timings differ from each other or not (step S8). When the two valve-opening timings differ from each other, the flow proceeds to step S9 and more advanced one is selected and set as the valve-opening timing. On the other hand, when the two valve-opening timings equate to each other, the flow proceeds to step S10 and the value itself is set as the valve-opening timing.

At step S11, the injection start times are respectively obtained based on the charging efficiency Ec and the volumetric efficiency Ev, using the second maps. Then, the judgment is made on whether the two injection start times differ from each other or not (step S12). When the two injection start times differ from each other, the flow proceeds to step S13 and more delayed one is selected and set as the injection start time. On the other hand, when the two injection star times equate to each other, the flow proceeds to step S14 and the value itself is set as the injection start time. Then, the variable valve mechanism 20 and the port injector 11 are respectively controlled by the first controller 1E and the second controller 1F (step S15), and the flow returns.

5. Advantageous Effects (1) According to the control apparatus 1 described above, each of the valve-opening timing (i.e., the valve overlap period) of the intake valve 12 and the injection start time (i.e., port injection timing) of fuel from the port injector 11 is set based on the actual amount Q of intake air. Specifically, in the case where the actual amount Q of intake air is within the output focus area, the valve-opening timing is advanced and the injection start time is delayed. Thus, the occurrence of the pass-through can be suppressed while the desired engine output is achieved.

(2) According to the control apparatus 1 described above, as the actual amount Q of intake air increases within the output focus area, the valve-opening timing is advanced and the injection start time is delayed. As the actual amount Q of intake air increases, the air becomes less likely to flow backwards even if the intake valve 12 is closed during the compression stroke because the inertial force of air increases. In view of this, by advancing the valve-opening timing as the actual amount Q of intake air increases within the output focus area, the valve-closing timing is also advanced, so that the amount of air contributing to combustion can be increased and consequently, the output of the engine 10 can be enhanced. On the other hand, the pass-through of fuel may occur more readily because of the extended valve overlap period, but by delaying the injection start time with an increase in the actual amount Q of intake air, the pass-through of fuel can be efficiently suppressed.

(3) The engine 10 described above includes the turbocharger 16 and the output focus area covers a range of the actual amount Q of intake air being in the condition where supercharging is performed. In the case where the turbocharger 16 performs supercharging, that is, where the actual amount Q of intake air is within the output focus area, since the control apparatus 1 described above advances the valve-opening timing, the desired output can be ensured. Further, in this case, since the injection start time is delayed, the occurrence of the pass-through can be suppressed.

It should be noted that since the supercharging pressure and the amount Q of intake air that defines the first range (the output focus area) are in a proportional relationship, the first range (in which the amount Q of intake air is equal to or more than the predetermined value Qo) preferably covers at least a range of "supercharging pressure atmospheric pressure". If the amount Q of intake air is replaced by a load or torque, the first range is preferably a medium-high load range in which the supercharging pressure becomes equal to or higher than the atmospheric pressure due to the supercharging executed by the turbocharger 16 with the throttle valve 19 fully opened. On the other hand, the second range (the fuel consumption focus area) is preferably a low-load range in which the amount Q of intake air is controlled with the throttle valve 19.

(4) According to the control apparatus 1 described above, the injection start times are calculated based on the charging efficiency Ec and the volumetric efficiency Ev, respectively, and when the two injection start times differ from each other, more delayed one is set as the injection start time. Thus, the pass-through of fuel can be suppressed by further considering the influence of atmospheric pressure (the altitude, for example) and the stability of combustion can be enhanced. In addition, since the above embodiment employs the configuration that similarly calculates the two valve-opening timings and sets more advanced one as the valve-opening timing when the two differ from each other, the desired engine output can be achieved by further considering the influence of atmospheric pressure.

(5) According to the control apparatus 1 described above, the valve-opening timing is delayed as the actual amount Q of intake air increases within the fuel consumption focus area, so that the amount of intake air can be increased in situations where the output is to be ensured even in the fuel consumption focus area, achieving the desired engine output. Further, since the above embodiment employs the configuration that sets the limit value $SOI_{LIM}$ of the injection start time on the delayed angle side, minimum mixing time for fuel and fresh air can be secured even when the injection start time is controlled to the most delayed angle. In addition, since the limit value $SOI_{LIM}$ is set on the further advanced angle side as the engine rotational speed Ne increases (as the mixture becomes less likely to cause pass-through), the mixing time can be secured while taking the pass-through into consideration. Further, since the above embodiment employs the configuration that sets the valve-opening timing and the injection start time by using the control maps set in advance, complicated arithmetic processing can be avoided, leading to a reduction in a control load.

According to the control apparatus 1 for the engine 10, the occurrence of the pass-through can be suppressed while the desired engine output is achieved.

6. Miscellaneous

The embodiment may be modified in various manners without departing from the purpose of the embodiment, irrespective of the above. Each element of the above embodiment can be selected and omitted if required and can be combined if appropriate.

The above embodiment illustrates an example in which the valve-opening timing and the injection start time are at least one of set by using the control maps, but the control maps are not essential and alternatively, the valve-opening timing and the injection start time may be set by using mathematical formulas, for example. Each characteristic of the control maps (the first maps and the second maps) illustrated in FIGS. 2 to 5 is merely an example and control maps other than the above are also applicable in using control maps.

The above-mentioned change in the advanced angle of the valve-opening timing with respect to the load (the value of the charging efficiency Ec at which the advancing starts, the relationship between an increase in the load and the quantity of the advanced angle, etc.) is merely an example. The above-mentioned change in the delayed angle of the injection start time with respect to the load (the value of the charging efficiency Ec at which the delaying starts, the relationship between an increase in the load and the quantity of the delayed angle, etc.) is merely an example. When the load is low, the pressure in the intake passage 15 is low and does not exceeds the exhaust pressure, so that the pass-through of fuel is less likely to happen, for example. Because of this, delaying the injection start time may be omitted on the low-load side.

The structure of the engine 10 described above is illustrative and may not be limited to the above. For example, the engine may include, in addition to the port injector 11, an in-cylinder injector that injects fuel directly into the cylinder. The variable valve mechanism suffices as long as it includes the mechanism that changes the valve-opening timing of at least the intake valve 12, so that the valve timing adjusting mechanism 21 on a side of the exhaust valve 13 may be omitted. To the contrary, the variable valve mechanism may further include a mechanism (valve lift amount adjusting mechanism) that continuously changes the maximum lift amount of the intake valve 12 and/or the exhaust valve 13.

REFERENCE SIGNS LIST 1 control apparatus
1A target torque calculator 1B throttle controller
1C charging efficiency calculator (first calculator)
1D volumetric efficiency calculator (second calculator)
1E first controller (first controller, first control means)
1F second controller (second controller, second control means)
3 air flow sensor (first detector, first detecting means)
8 atmospheric pressure sensor (second detector)
10 engine
11 port injector (fuel injector)
12 intake valve
15 intake passage
16 turbocharger
20 variable valve mechanism
Ec charging efficiency
Ev volumetric efficiency
Ne engine rotational speed
Q actual amount of intake air (amount of intake air)
Qo predetermined value The invention thus described, it will be obvious that the same may be varied in many ways. Such variations are not to be regarded as a departure from the spirits and the scope of the invention, and all such modifications as would be obvious to one skilled in the art are intended to be included within the scope of the following claims.

What is claimed is:

1. A control apparatus for an engine, the engine comprising a fuel injector that injects fuel into an intake port, a variable valve mechanism that changes opening/closing timings of at least an intake valve, and a first detector that detects an amount of intake air flowing through an intake passage of the engine, the control apparatus comprising:
    a first controller that sets a valve-opening timing of the intake valve in response to the amount of intake air; and
    a second controller that sets an injection start time of the fuel injector in response to the amount of intake air, wherein:
    in a case where the amount of intake air is within a first range being greater than a predetermined value, the first controller advances the valve-opening timing as compared with a case where the amount of intake air is equal to the predetermined value; and
    in the case where the amount of intake air is within the first range, the second controller delays the injection start time as compared with a case where the amount of intake air is within a second range being less than the predetermined value, and wherein
    the first controller advances the valve-opening timing as the amount of intake air increases within the first range; and
    the second controller continuously increases the delay of the injection start time as the amount of intake air increases within the first range.

2. The control apparatus according to claim 1, wherein the engine includes a turbocharger, and
    the first range covers a range of the amount of intake air being in a condition where supercharging pressure is equal to or higher than atmospheric pressure.

3. The control apparatus according to claim 1, wherein the engine includes a second detector that detects atmospheric pressure, and
    the control apparatus further comprising:
    a first calculator that calculates charging efficiency based on the amount of intake air; and
    a second calculator that calculates volumetric efficiency based on the amount of intake air and the atmospheric pressure, wherein
    the second controller calculates the injection start times based on the charging efficiency and the volumetric efficiency, respectively, and when the injection start times calculated by the second controller differ from each other, sets more delayed one as the injection start time.

4. The control apparatus according to claim 2, wherein the engine includes a second detector that detects atmospheric pressure,
    the control apparatus further comprising:
    a first calculator that calculates charging efficiency based on the amount of intake air; and
    a second calculator that calculates volumetric efficiency based on the amount of intake air and the atmospheric pressure, wherein
    the second controller calculates the injection start times based on the charging efficiency and the volumetric efficiency, respectively, and when the injection start times calculated by the second controller differ from each other, sets more delayed one as the injection start time.

5. The control apparatus according to claim 1, wherein the first controller continuously increases delay of the valve-opening timing as the amount of intake air increases toward the predetermined value, at which the second range switches from the second range to the first range, within the second range.

6. The control apparatus according to claim 2, wherein the first controller continuously increases delay of the valve-opening timing as the amount of intake air increases toward a predetermined value, at which the second range switches from the second range to the first range, within the second range.

7. The control apparatus according to claim 3, wherein the first controller continuously increases delay of the valve-opening timing as the amount of intake air increases toward a predetermined value, at which the second range switches from the second range to the first range, within the second range.

8. The control apparatus according to claim 4, wherein the first controller continuously increases delay of the valve-opening timing as the amount of intake air increases toward a predetermined value, at which the second range switches from the second range to the first range, within the second range.

9. A control apparatus for an engine, the engine comprising a fuel injector that injects fuel into an intake port, a variable valve mechanism that changes opening/closing timings of at least an intake valve, and a first detecting means that detects an amount of intake air flowing through an intake passage of the engine, the control apparatus comprising:
    a first control means that sets a valve-opening timing of the intake valve in response to the amount of intake air; and
    a second control means that sets an injection start time of the fuel injector in response to the amount of intake air, wherein:
    in a case where the amount of intake air is within a first range being greater than a predetermined value, the first control means advances the valve-opening timing as compared with a case where the amount of intake air is equal to the predetermined value; and
    in the case where the amount of intake air is within the first range, the second control means delays the injection start time as compared with a case where the amount of intake air is within a second range being less than the predetermined value, and wherein the first control means advances the valve-opening timing as the amount of intake air increases within the first range; and the second controller continuously increases the delay of the injection start time as the amount of intake air increases within the first range.

10. A control apparatus for an engine, the engine comprising a fuel injector that injects fuel into an intake port, a variable valve mechanism that changes opening/closing timings of at least an intake valve, and a first detector that detects an amount of intake air flowing through an intake passage of the engine, the control apparatus comprising:
- a first controller that sets a valve-opening timing of the intake valve in response to the amount of intake air; and
- a second controller that sets an injection start time of the fuel injector in response to the amount of intake air, wherein:
- in a case where the amount of intake air is within a first range being greater than a predetermined value, the first controller advances the valve-opening timing as compared with a case where the amount of intake air is equal to the predetermined value; and
- in the case where the amount of intake air is within the first range, the second controller delays the injection start time as compared with a case where the amount of intake air is within a second range being less than the predetermined value, and wherein
- the engine includes a second detector that detects atmospheric pressure, and the control apparatus further comprising:
- a first calculator that calculates charging efficiency based on the amount of intake air; and
- a second calculator that calculates volumetric efficiency based on the amount of intake air and the atmospheric pressure, wherein the second controller calculates the injection start times based on the charging efficiency and the volumetric efficiency, respectively, and when the injection start times calculated by the second controller differ from each other, sets more delayed one as the injection start time.

11. The control apparatus according to claim 10, wherein:
the first controller advances the valve-opening timing as the amount of intake air increases within the first range; and the second controller delays the injection start time as the amount of intake air increases within the first range.

12. The control apparatus according to claim 10, wherein the engine includes a turbocharger, and the first range covers a range of the amount of intake air being in a condition where supercharging pressure is equal to or higher than atmospheric pressure.

13. The control apparatus according to claim 10, wherein the first controller continuously delays the valve-opening timing as the amount of intake air increases toward a predetermined intake air amount, at which the second range switches from the second range to the first range, within the second range.

* * * * *